United States Patent
Nanmoto (10) Patent No.: US 7,730,250 B2
(45) Date of Patent: Jun. 1, 2010

(54) INTERRUPT CONTROL CIRCUIT, CIRCUIT BOARD, ELECTRO-OPTIC DEVICE, AND ELECTRONIC APPARATUS

(75) Inventor: Takashi Nanmoto, Sendai (JP)

(73) Assignee: Seiko Epson Corporation, Tokyo (JP)

( * ) Notice: Subject to any disclaimer, the term of this patent is extended or adjusted under 35 U.S.C. 154(b) by 138 days.

(21) Appl. No.: 11/964,436

(22) Filed: Dec. 26, 2007

(65) Prior Publication Data

US 2008/0162761 A1 Jul. 3, 2008

(30) Foreign Application Priority Data

Dec. 27, 2006 (JP) ............................. 2006-352025
Dec. 19, 2007 (JP) ............................. 2007-327555

(51) Int. Cl.
*G06F 13/24* (2006.01)
*G06F 13/26* (2006.01)
*G06F 13/42* (2006.01)

(52) U.S. Cl. ...................... 710/269; 710/260; 710/264; 710/268; 713/400

(58) Field of Classification Search ......... 710/260–264, 710/266–269; 713/400–401
See application file for complete search history.

(56) References Cited

U.S. PATENT DOCUMENTS

| | | | | |
|---|---|---|---|---|
| 5,542,076 A | * | 7/1996 | Benson et al. ............... | 710/260 |
| 5,784,271 A | * | 7/1998 | Nagasaki ........................ | 700/4 |
| 5,905,913 A | * | 5/1999 | Garrett et al. ................ | 710/49 |
| 5,937,199 A | * | 8/1999 | Temple ........................ | 710/262 |
| 6,012,121 A | * | 1/2000 | Govindaraju et al. ........ | 710/260 |
| 6,574,680 B1 | * | 6/2003 | Tangvald et al. .............. | 710/10 |
| 6,633,942 B1 | * | 10/2003 | Balasubramanian ........ | 710/264 |
| 7,162,559 B1 | * | 1/2007 | Kallat et al. ................. | 710/262 |
| 7,340,547 B1 | * | 3/2008 | Ledebohm .................. | 710/260 |
| 2002/0073263 A1 | * | 6/2002 | Barrenscheen .............. | 710/260 |
| 2002/0166018 A1 | * | 11/2002 | Kim ........................... | 710/260 |
| 2002/0188784 A1 | * | 12/2002 | Boles et al. ................. | 710/260 |
| 2005/0152018 A1 | * | 7/2005 | Abramson et al. .......... | 359/265 |
| 2005/0182879 A1 | * | 8/2005 | Vu .............................. | 710/260 |

FOREIGN PATENT DOCUMENTS

| | | |
|---|---|---|
| JP | A-06-004173 | 1/1994 |
| JP | A-10-302394 | 11/1998 |
| JP | A-2000-231487 | 8/2000 |
| JP | A-2002-207530 | 7/2002 |
| JP | A-2004-234098 | 8/2004 |
| JP | A-2004-264899 | 9/2004 |
| JP | A-2004-272794 | 9/2004 |

* cited by examiner

*Primary Examiner*—Thomas J Cleary
(74) *Attorney, Agent, or Firm*—Oliff & Berridge, PLC (57) ABSTRACT

An interrupt control circuit includes: a section that generates an interrupt signal for requesting an interrupt in response to occurrence of a plurality of interrupt causes; a section that generates an interrupt vector signal for indicating a storing destination of an interrupt processing program corresponding any of the plurality of interrupt causes; a section that outputs the interrupt signal and the interrupt vector signal to an interrupt process executing circuit; and a section that controls the interrupt signal and an output value of the interrupt vector signal in sync with an interrupt acceptance signal input from the interrupt process executing circuit, the interrupt acceptance signal representing a condition in which an interrupt process is acceptable.

10 Claims, 6 Drawing Sheets

INTERRUPT CONTROL CIRCUIT, CIRCUIT BOARD, ELECTRO-OPTIC DEVICE, AND ELECTRONIC APPARATUS

The entire disclosure of Japanese Patent Application Nos: 2006-352025, filed Dec. 27, 2006 and 2007-327555, filed Dec. 19, 2007 are expressly incorporated by reference herein.

BACKGROUND OF THE INVENTION

1. Technical Field

The present invention relates to an interrupt control circuit, a circuit board, an electro-optic device, and an electronic apparatus.

2. Related Art

There is disclosed an example of an interrupt control circuit for performing interrupt control to a central processing unit (CPU) in, for example, Illustrated Introduction to Z80 Microcomputer Application System for Hardware, Second Edition, pp. 186. This interrupt control circuit is composed of an OR circuit for outputting an interrupt signal, which is a logical OR signal of a plurality of interrupt cause signals input from the outside, to the CPU, and an interrupt vector generating circuit for outputting, to the CPU, an interrupt vector signal corresponding to the interrupt cause signal. For example, in the case in which the CPU is provided to a personal computer; the interrupt cause signals are output from a mouse, a keyboard, and so on. It should be noted that the interrupt vector signal denotes a signal indicating an address on the memory where an interrupt processing program to be executed by the CPU correspondingly to the interrupt cause signal is stored.

When at least one of the plurality of interrupt cause signals are controlled to be in a high level, the OR circuit outputs the interrupt signal of a high level to the CPU. An interrupt vector generating circuit outputs the interrupt vector signal corresponding to the interrupt cause signal controlled to be in a high level to the CPU. Here, when two or more of the interrupt cause signals are controlled to be in a high level, the interrupt vector generating circuit outputs, to the CPU, the interrupt vector signal corresponding to the interrupt cause signal with a higher priority along an order of priority determined previously. When the interrupt signal of a high level is input in the CPU, in other words, the CPU recognizes occurrence of the interrupt request, the CPU executes the interrupt processing program stored in the address on the memory indicated by the interrupt vector signal, thus performing the interrupt processing.

The interrupt control circuit and the CPU are synchronous circuits operating with a common clock signal, in which the interrupt control circuit outputs the interrupt signal in sync with the clock signal, and the CPU monitors the state of the interrupt signal input from the interrupt control circuit with a predetermined timing specified with the clock signal, and performs the interrupt processing if the CPU recognizes the state of the interrupt signal as a high level with that timing.

As described above, in the case with the synchronous circuit in the related art, since the monitoring process of the interrupt signal is required, the power consumption of the CPU increases, and further, since all of the operation timings are specified with the clock signal, the operation speed is low. On the other hand, in recent years, an asynchronous circuit without requiring a common clock signal draws attention as a measure for realizing a high speed and low power consumption electronic circuit. However, as described above, since the interrupt control circuit in the related art requires the clock signal common to the CPU, it is difficult to perform the interrupt control to an asynchronous type of CPU. Therefore, the asynchronous CPU can hardly be used, thus it is difficult to realize a high speed and low power consumption interrupt control circuit.

SUMMARY

In consideration of the above circumstances, an advantage of the invention is to provide an interrupt control circuit capable of performing interrupt control to the asynchronous CPU, thus achieving a higher speed and lower power consumption. Further, another advantage of the invention is to provide a circuit board, an electro-optic device, and an electronic apparatus each provided with such an interrupt control circuit, and consequently capable of performing interrupt control to the asynchronous CPU, thus achieving a higher speed and lower power consumption.

According to a first aspect of the invention, there is provided an interrupt control circuit for outputting an interrupt signal for requesting an interrupt processing in accordance with an interrupt cause signal from one of more of external circuit, and an interrupt vector signal for indicating the storing destination of the interrupt processing program corresponding to the interrupt cause signal to an interrupt process executing circuit, and for outputting the interrupt signal in sync with the interrupt acceptance signal input from the interrupt process executing circuit and indicating the state in which an interrupt process can be accepted.

According to the interrupt control signal having such a feature, since the interrupt signal is output in sync with the interrupt acceptance signal input from the interrupt process executing circuit such as a CPU and indicative of the state in which the interrupt process can be accepted, the common clock required in the related art can be eliminated, and it can correspond to the asynchronous CPU, thus the higher speed and lower power consumption can be realized.

Further, the interrupt control circuit according to the first aspect of the invention preferably includes an interrupt signal generating circuit for resetting the interrupt signal in sync with setting of the interrupt acceptance signal while setting the interrupt signal in sync with resetting of the interrupt acceptance signal, and an interrupt vector generating circuit for outputting the interrupt vector signal in sync with setting of the interrupt signal.

In the communication protocol between the asynchronous circuits, it is inhibited that the interrupt control circuit outputs the interrupt signal to the interrupt process executing circuit such as a CPU in a period when the interrupt process executing circuit outputs the interrupt acceptance signal of a set state.

Therefore, as described above, by resetting the interrupt signal in sync with setting of the interrupt acceptance signal while setting the interrupt signal in sync with resetting of the interrupt acceptance signal, and further outputting the interrupt vector signal in sync with setting of the interrupt signal, the signal communication compliant with the communication protocol between the asynchronous circuits can be performed.

Further, it is preferable that the interrupt control circuit according to the first aspect of the invention further include a interrupt cause storage circuit provided correspondingly to each of the interrupt cause signals, storing the state of the interrupt cause signals, and outputting the interrupt cause state signals for representing the state of the interrupt causes while resetting the stored state of the interrupt cause signal in sync with input of the reset signal, and a reset signal generating circuit for specifying which interrupt cause signal is output correspondingly to the interrupt vector signal, and outputting the reset signal to the interrupt cause storage circuit corresponding to the specified interrupt cause signal in sync with setting of the interrupt acceptance signal. The interrupt signal generating circuit sets the interrupt signal when at least one interrupt cause state signal is in a set state, and the interrupt vector generating circuit outputs the interrupt vector signal corresponding to the interrupt cause state signal in a set state.

Thus, even in the case in which a plurality of interrupt cause signals is set simultaneously, which interrupt cause signal is set can be stored, and after the interrupt process corresponding to one interrupt cause signal is completed, the interrupt process corresponding to the next interrupt cause signal can continuously be executed. Further, by resetting the state of the interrupt cause signal corresponding to the completed interrupt process in sync with setting of the interrupt acceptance signal, overlapping between the interrupt process to be executed next and the completed interrupt process can be prevented.

Further, since the interrupt control circuit in the related art is not provided with a function of storing or initializing the state of the interrupt cause signal, such a function needs to be provided to the external circuit side, thus the design work efficiency is deteriorated to incur lengthening of the design period therefor. In contrast, since the interrupt control circuit according to an aspect of the invention is provided with the function of storing or initializing the state of the interrupt cause signal, in other words, the interrupt cause storage circuit and the reset signal generating circuit for outputting the reset signal to the interrupt cause storage circuit, improvement of design work efficiency and shortening of the design period can be realized.

Further, it is preferable that the interrupt control circuit according to the first aspect of the invention further include a reset signal generating circuit, in the case in which the interrupt cause storage circuit for storing the state of the interrupt cause signal to output the interrupt cause state signal for representing the state of the interrupt cause signal, and resetting the stored state of the interrupt cause signal in sync with input of the reset signal is provided to the external circuit side, for specifying which interrupt cause signal the interrupt vector signal is output correspondingly to, and outputting the reset signal to the interrupt cause storage circuit corresponding to the specified interrupt cause signal in sync with setting of the interrupt acceptance signal. The interrupt signal generating circuit sets the interrupt signal when at least one interrupt cause state signal is in a set state, and the interrupt vector generating circuit outputs the interrupt vector signal corresponding to the interrupt cause state signal in a set state.

As described above, even in the case in which the interrupt cause storage circuit as the function of storing or initializing the state of the interrupt cause signal is provided on the external circuit side as in the related art, it becomes possible to cope with such a case by outputting the reset signal for resetting the state of the interrupt cause signal to the external circuit side.

Further, it is preferable that in the interrupt control circuit according to the first aspect of the invention, the interrupt vector generating circuit, in the case in which more than one interrupt cause state signals in the set state exist, outputs the interrupt vector signal corresponding to the interrupt cause state signal with a higher priority.

Further, it is preferable that the interrupt control circuit according to the first aspect of the invention includes a first pulse generating circuit provided for each of the plurality of interrupt cause state signals and for outputting a pulse signal in sync with setting of a corresponding one of the plurality of interrupt cause state signals, a second pulse generating circuit for outputting a pulse signal in sync with resetting of the interrupt acceptance signal, a first logical OR circuit for outputting a first logical OR signal of the pulse signal output from the first pulse generating circuit and the pulse signal output from the second pulse generating circuit, a second logical OR circuit for outputting a second logical OR signal of the interrupt cause state signals, and a third pulse generating circuit for outputting a pulse signal in sync with setting of the interrupt acceptance signal. The interrupt signal generating circuit outputs the state of the second logical OR signal as an interrupt signal in sync with the first logical OR signal, while resetting the interrupt signal in sync with the pulse signal output from the third pulse generating circuit, and the reset signal generating circuit outputs the reset signal in sync with the pulse signal output from the third pulse generating circuit.

The interrupt control circuit according to the first aspect of the invention is an asynchronous circuit, and consequently has no common clock. Therefore, by generating the pulse signal as described above, the pulse signal can be used as a pseudo-clock signal for regulating the operation timing of each circuit.

Further, it is preferable that in the interrupt control circuit according to the first aspect of the invention, the reset signal generating circuit includes a specifying circuit for specifying which interrupt cause signal is output correspondingly to the interrupt vector signal, and outputting a specifying signal representing a specifying result, and a logical AND circuit provided for each of the interrupt cause storage circuits, and having the specifying signal and the pulse signal output by the third pulse generating circuit as inputs. The specifying circuit controls the specifying signal to be output to the logical AND circuit corresponding to the interrupt cause storage circuit storing the state of the specified interrupt cause signal to be in a setting state, and the logical AND circuit outputs the logic AND signal of the specifying signal and the pulse signal output by the third pulse generating circuit as the reset signal.

By adopting such a configuration, the reset signal generating circuit can simply be designed, thus contributing to improvement of design work efficiency.

Further, it is preferable that in the interrupt control circuit according to the first aspect of the invention, the first pulse generating circuit be configured including a first delay circuit for delaying the interrupt cause state signal a predetermined period of time, a first logic inverting circuit for outputting a logically inverted signal of the interrupt cause state signal delayed by the first delay circuit, and a first logical AND circuit for outputting a logical AND signal of the logically inverted signal output from the first logic inverting circuit and the interrupt cause state signal as a pulse signal.

By adopting such a configuration, the first pulse signal generating circuit can simply be designed, thus contributing to improvement of design work efficiency.

Further, it is preferable that in the interrupt control circuit according to the first aspect of the invention, the second pulse generating circuit be configured including a second delay circuit for delaying the interrupt acceptance signal by a predetermined period of time, a second logic inverting circuit for outputting a logically inverted signal of the interrupt acceptance signal, and a second logical AND circuit for outputting a logical AND signal of the interrupt acceptance signal delayed by the second delay circuit and the logically inverted signal output form the second logic inverting circuit as a pulse signal.

By adopting such a configuration, the second pulse signal generating circuit can simply be designed, thus contributing to improvement of design work efficiency.

Further, it is preferable that in the interrupt control circuit according to the first aspect of the invention, the third pulse generating circuit be configured including a third delay circuit for delaying the interrupt acceptance signal by a predetermined period of time, a third logic inverting circuit for outputting a logically inverted signal of the interrupt acceptance signal delayed by the third delay circuit, and a third logical AND circuit for outputting a logical AND signal of the logically inverted signal output from the third logic inverting circuit and the interrupt acceptance signal as a pulse signal.

By adopting such a configuration, the third pulse signal generating circuit can simply be designed, thus contributing to improvement of design work efficiency.

Further, it is preferable that the interrupt control circuit according to the first aspect of the invention include a fourth delay circuit disposed between the first logical OR circuit and the interrupt signal generating circuit, for delaying the first logical OR signal output from the first logical OR circuit a predetermined period of time, and outputting the delayed first logical OR signal to the interrupt signal generating circuit.

Since the interrupt signal generating circuit outputs the state of the second logical OR signal as the interrupt signal in sync with the first logical OR signal, the first logical OR signal needs to be output after the second logical OR signal. Therefore, by providing the fourth delay circuit between the first logical OR circuit and the interrupt signal generating circuit as described above, the condition described above can be satisfied.

Meanwhile, a circuit board according to a second aspect of the invention is provided with the interrupt control circuit described above. Thus, the interrupt control to an asynchronous CPU is possible, and the circuit board capable of realizing a higher speed and lower power consumption can be obtained.

Further, an electro-optic device according to a third aspect of the invention is provided with the circuit board described above. Thus, the interrupt control to an asynchronous CPU is possible, and the electro-optic device capable of realizing a higher speed and lower power consumption can be obtained.

Further, an electronic apparatus according to a fourth aspect of the invention is provided with the electro-optic device described above. Thus, the interrupt control to an asynchronous CPU is possible, and the electronic apparatus capable of realizing a higher speed and lower power consumption can be obtained.

Further, according to the first aspect of the invention, there is provided a interrupt control device including a section that generates an interrupt signal for requesting an interrupt in response to occurrence of a plurality of interrupt causes, a section that generates an interrupt vector signal for indicating a storing destination of an interrupt processing program corresponding any of the plurality of interrupt causes, a section that outputs the interrupt signal and the interrupt vector signal to an interrupt process executing circuit, and a section that controls the interrupt signal and an output value of the interrupt vector signal in sync with an interrupt acceptance signal for representing a condition, in which an interrupt process can be accepted, input from the interrupt process executing circuit.

In the first aspect of the invention, it is preferable to further include an interrupt signal generating circuit, and an interrupt vector generating circuit. The interrupt signal generating circuit resets the interrupt signal when change in the interrupt acceptance signal represents setting of an interrupt process acceptance, and performs an updating operation of the interrupt signal when change in the interrupt acceptance signal represents resetting of an interrupt process acceptance, and the interrupt vector generating circuit inputs an interrupt vector generation condition, and performs an updating operation of the interrupt vector signal in accordance the interrupt vector generation condition when change in the interrupt acceptance signal represents resetting of an interrupt process acceptance.

Further, in the first aspect of the invention, it is preferable to further include a reset signal generating circuit, and an interrupt cause storage circuit for storing a state of each of a plurality of interrupt causes. The reset signal generating circuit generates a reset signal for resetting any of the plurality of interrupt causes indicated by the interrupt vector signal when change in the interrupt acceptance signal represents setting of an interrupt process acceptance, the interrupt cause storage circuit generates the interrupt vector generation condition based on the state of the storage, and when recognizing occurrence of any of the plurality of interrupt causes, instructs the interrupt signal generating circuit to set the interrupt signal, and the state of the storage is updated in response to one of occurrence of any of the plurality of interrupt causes and resetting of any of the plurality of interrupt causes indicated by the interrupt vector signal by the reset signal.

BRIEF DESCRIPTION OF THE DRAWINGS

The invention will now be described with reference to the accompanying drawings, wherein like numbers refer to like elements.

DESCRIPTION OF THE EMBODIMENTS

Hereinafter, an interrupt control circuit, a circuit board, an electro-optic device, and an electronic apparatus according to embodiments of the invention will be explained with reference to the accompanying drawings.

Interrupt Control Circuit

First Embodiment

Figure 1:
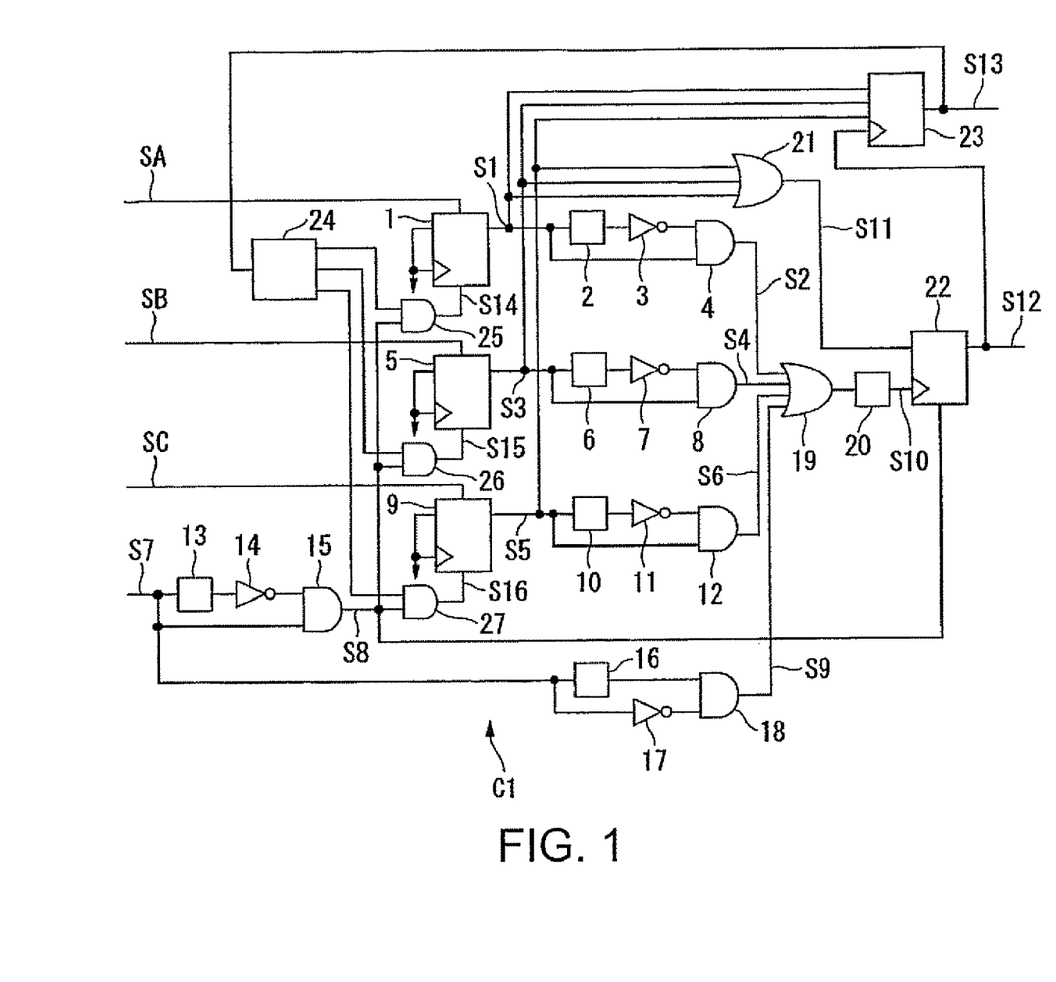
FIG. 1 is a block diagram showing a configuration of an interrupt control circuit according to a first embodiment of the invention.

Firstly, the interrupt control circuit according to a first embodiment of the invention will be explained. FIG. 1 is a block diagram showing a configuration of an interrupt control circuit C1 according to the first embodiment. As shown in FIG. 1, the interrupt control circuit C1 in the first embodiment is composed of a flip-flop circuit 1, a delay circuit 2, an inverter circuit 3, an AND circuit 4, a flip-flop circuit 5, a delay circuit 6, an inverter circuit 7, an AND circuit 8, a flip-flop circuit 9, a delay circuit 10, an inverter 11, an AND circuit 12, a delay circuit 13, an inverter circuit 14, an AND circuit 15, a delay circuit 16, an inverter circuit 17, an AND circuit 18, an OR circuit 19, a delay circuit 20, an OR circuit 21, a flip-flop circuit 22, an interrupt vector generating circuit 23, a decoder circuit 24, an AND circuit 25, an AND circuit 26, and an AND circuit 27.

The flip-flop circuits 1, 5, and 9 are components corresponding to an interrupt cause storage circuit according to the invention. The delay circuit 2, the inverter circuit 3, and the AND circuit 4 are components respectively corresponding to a first delay circuit, a first logic inverting circuit, and a first logical AND circuit forming a first pulse generating circuit according to the invention. The delay circuit 6, the inverter circuit 7, and the AND circuit 8 are also components respectively corresponding to the first delay circuit, the first logic inverting circuit, and the first logical AND circuit forming the first pulse generating circuit according to the invention. The delay circuit 10, the inverter circuit 11, and the AND circuit 12 are also components respectively corresponding to the first delay circuit, the first logic inverting circuit, and the first logical AND circuit forming the first pulse generating circuit according to the invention. The delay circuit 13, the inverter circuit 14, and the AND circuit 15 are components respectively corresponding to a third delay circuit, a third logic inverting circuit, and a third logical AND circuit forming a third pulse generating circuit according to the invention. The delay circuit 16, the inverter circuit 17, and the AND circuit 18 are components respectively corresponding to a second delay circuit, a second logic inverting circuit, and a second logical AND circuit forming a second pulse generating circuit according to the invention. The OR circuit 19 is a component corresponding to a first logical OR circuit according to the invention, the delay circuit 20 is a component corresponding to a fourth delay circuit according to the invention, the OR circuit 21 is a component corresponding to a second logical OR circuit according to the invention, the flip-flop circuit 22 is a component corresponding to an interrupt signal generating circuit according to the invention, the interrupt vector generating circuit 23 is a component corresponding to an interrupt vector generating circuit according to the invention. The decoder circuit 24, the AND circuit 25, the AND circuit 26, and the AND circuit 27 are components corresponding to a specifying circuit and logical AND circuits forming a reset signal generating circuit according to the invention.

The interrupt control circuit C1 according to the first embodiment has interrupt cause signals SA, SB, and SC output from an external circuit (not shown), and an interrupt acceptance signal S7 output from a CPU (an interrupt process executing circuit) not shown as inputs, and outputs an interrupt signal S12 and an interrupt vector signal S13 to the CPU in accordance with such signals. The interrupt cause signal SA is input to the flip-flop circuit 1, the interrupt cause signal SB is input to the flip-flop circuit 5, and the interrupt cause signal SC is input to the flip-flop circuit 9. Further, the interrupt acceptance signal S7 is input to the delay circuit 13, the AND circuit 15, the delay circuit 16, and the inverter circuit 17. It should be noted that the interrupt control circuit C1 is a positive-logic circuit, and transition of the state of a signal from a low level to a high level is described as setting, while transition thereof from a high level to a low level is described as resetting.

The flip-flop circuit 1 is a set-reset flip-flop circuit functioning as a register for storing the state of the interrupt cause signal SA, and outputs an interrupt cause state signal S1 of a high level to the delay circuit 2, the AND circuit 4, the OR circuit 21, and the interrupt vector generating circuit 23 in sync with setting of the interrupt cause signal SA. Further, the flip-flop circuit 1 controls the interrupt cause state signal S1 described above to be in a low level (i.e., resets the signal) in sync with setting of a reset signal S14 input from the AND circuit 25.

The delay circuit 2 delays the interrupt cause state signal S1 a predetermined period of time, and then outputs it to the inverter circuit 3. The inverter circuit 3 outputs, to the AND circuit 4, a logically inverted signal of the interrupt cause state signal S1 thus delayed by the delay circuit 2 described above. The AND circuit 4 outputs, to the OR circuit 19, a pulse signal S2 as a logical AND signal of the interrupt cause state signal S1 input from the flip-flop circuit 1 and the logically inverted signal of the interrupt cause state signal S1, input from the inverter circuit 3.

The flip-flop circuit 5 is a set-reset flip-flop circuit functioning as a register for storing the state of the interrupt cause signal SB, and outputs an interrupt cause state signal S3 of a high level to the delay circuit 6, the AND circuit 8, the OR circuit 21, and the interrupt vector generating circuit 23 in sync with setting of the interrupt cause signal SB. Further, the flip-flop circuit 5 controls the interrupt cause state signal S3 described above to be in a low level (i.e., resets the signal) in sync with setting of a reset signal S15 input from the AND circuit 26.

The delay circuit 6 delays the interrupt cause state signal S3 a predetermined period of time, and then outputs it to the inverter circuit 7. The inverter circuit 7 outputs, to the AND circuit 8, a logically inverted signal of the interrupt cause state signal S3 thus delayed by the delay circuit 6 described above. The AND circuit 8 outputs, to the OR circuit 19, a pulse signal S4 as a logical AND signal of the interrupt cause state signal S3 input from the flip-flop circuit 5 and the logically inverted signal of the interrupt cause state signal S3, input from the inverter circuit 7.

The flip-flop circuit 9 is a set-reset flip-flop circuit functioning as a register for storing the state of the interrupt cause signal SC, and outputs an interrupt cause state signal S5 of a high level to the delay circuit 10, the AND circuit 12, the OR circuit 21, and the interrupt vector generating circuit 23 in sync with setting of the interrupt cause signal SC. Further, the flip-flop circuit 9 controls the interrupt cause state signal S5 described above to be in a low level (i.e., resets the signal) in sync with setting of a reset signal S16 input from the AND circuit 27.

The delay circuit 10 delays the interrupt cause state signal S5 a predetermined period of time, and then outputs it to the inverter circuit 11. The inverter circuit 11 outputs, to the AND circuit 12, a logically inverted signal of the interrupt cause state signal S5 thus delayed by the delay circuit 10. The AND circuit 12 outputs, to the OR circuit 19, a pulse signal S6 as a logical AND signal of the interrupt cause state signal S5 input from the flip-flop circuit 9 and the logically inverted signal of the interrupt cause state signal S5, input from the inverter circuit 11.

The delay circuit 13 delays the interrupt acceptance signal S7 a predetermined period of time, and then outputs it to the inverter circuit 14. The inverter circuit 14 outputs, to the AND circuit 15, a logically inverted signal of the interrupt acceptance signal S7 thus delayed by the delay circuit 13 described above. The AND circuit 15 outputs a pulse signal S8, which is a logical AND signal of the interrupt acceptance signal S7 and the logically inverted signal of the interrupt acceptance signal S7 input from the inverter circuit 14, to the flip-flop circuit 22, the AND circuit 25, the AND circuit 26, and the AND circuit 27.

The delay circuit 16 delays the interrupt acceptance signal S7 a predetermined period of time, and then outputs it to the AND circuit 18. The inverter circuit 17 outputs the logically inverted signal of the interrupt acceptance signal S7 to the AND circuit 18. The AND circuit 18 outputs a pulse signal S9, which is a logical AND signal of the interrupt acceptance signal S7 delayed by the delay circuit 16 and the logically inverted signal of the interrupt acceptance signal S7, output from the inverter circuit 17, to the OR circuit 19.

The OR circuit 19 outputs the logical OR signal of the pulse signals S2, S4, S6, and S9 to the delay circuit 20. The delay circuit 20 outputs a sync signal S10, which is a signal obtained by delaying the logical OR signal input from the OR circuit 19 a predetermined period of time, to the flip-flop circuit 22. The OR circuit 21 outputs a logical OR signal S11 of the interrupt cause state signals S1, S3, and S5 to the flip-flop circuit 22. The flip-flop circuit 22 is a flip-flop with-reset circuit, and outputs the state of the logical OR signal S11 to the CPU and the interrupt vector generating circuit 23 as an interrupt signal S12 in sync with setting of the sync signal S10. Further, the flip-flop circuit 22 controls the interrupt signal S12 described above to be in a low level (i.e., resets the signal) in sync with setting of a pulse signal S8 input from the AND circuit 15.

The interrupt vector generating circuit 23 outputs a vector signal S13 corresponding to either one of the interrupt cause state signals S1, S3, and S5 to the CPU and the decoder circuit 24 in sync with setting of the interrupt signal S12. It should be noted that the interrupt vector signal S13 denotes a signal indicating an address on the memory where an interrupt processing program, which is to be executed by the CPU correspondingly to the interrupt cause signal corresponding to the interrupt cause state signal of a high level, is stored. In other words, in the case in which the state, for example, of the interrupt cause state signal S1 is in a high level, the interrupt vector generating circuit 23 outputs the vector signal S13 indicative of the address on the memory in which the interrupt processing program to be executed by the CPU in accordance with the interrupt cause signal SA is stored. It should be noted that in the case in which more than one of the interrupt cause state signals are in a high level, the interrupt vector generating circuit 23 outputs the interrupt vector signals S13 corresponding to the interrupt cause state signal (the interrupt cause signal) with a higher priority in accordance with the priority order defined previously. In the present embodiment, it is assumed that the interrupt cause signal SA has the highest priority, and the interrupt case signal SC has the lowest priority.

The decoder circuit 24 decodes the interrupt vector signal S13 to specify which interrupt cause signal the interrupt vector signal S13 is output for, and outputs a specifying signal of a high level to the AND circuit (25, 26, or 27) provided correspondingly to the flip-flop circuit (1, 5, or 9) storing the sate of the interrupt cause signal thus specified. Specifically, the decoder 24 outputs the specifying signal of a high level to the AND circuit 25 if it has specified that the interrupt vector signal S13 is output correspondingly to the interrupt cause signal SA, outputs the specifying signal of a high level to the AND circuit 26 if it has specified that the interrupt vector signal S13 is output correspondingly to the interrupt cause signal SB, or outputs the specifying signal of a high level to the AND circuit 27 if it has specified that the interrupt vector signal S13 is output correspondingly to the interrupt cause signal SC.

The AND circuit 25 outputs a reset signal S14, which is a logical AND signal of the pulse signal S8 input from the AND circuit 15 and the specifying signal input from the decoder circuit 24, to the flip-flop circuit 1. The AND circuit 26 outputs a reset signal S15, which is a logical AND signal of the pulse signal S8 input from the AND circuit 15 and the specifying signal input from the decoder circuit 24, to the flip-flop circuit 5. The AND circuit 27 outputs a reset signal S16, which is a logical AND signal of the pulse signal S8 input from the AND circuit 15 and the specifying signal input from the decoder circuit 24, to the flip-flop circuit 9.

As described above, FIG. 1 exemplifies the configuration of the case with three interrupt cause signals, and the set-reset flip-flop circuit for storing the state of the interrupt cause signal, the AND circuit for outputting the reset signal, the delay circuit forming the pulse generating circuit, the inverter circuit, and the AND circuit can suitably be added or removed in accordance with the number of the interrupt cause signals. Further, although in the present embodiment the interrupt control circuit composed of the positive-logic circuits is exemplified, this is not a limitation, but the interrupt control circuit can be composed of negative-logic circuits, wherein transition of the state of a signal from a high level to a low level is regarded as setting, while transition thereof from a low level to a high level is regarded as resetting.

Figure 2:
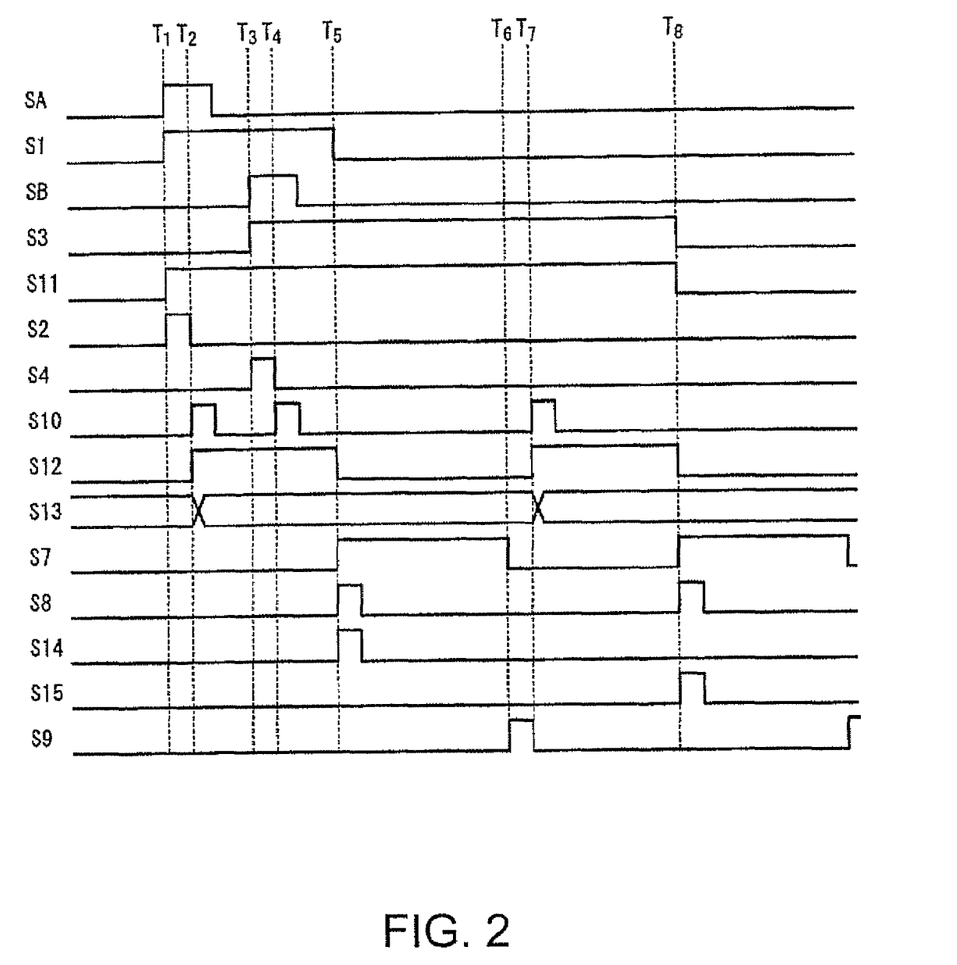
FIG. 2 is a timing chart showing an operation of an interrupt control circuit according to the first embodiment of the invention.

Then, an operation of the interrupt control circuit C1 according to the first embodiment configured as described above will be explained with reference to the timing chart shown in FIG. 2.

Firstly, when the interrupt cause signal SA is controlled to be in a high level (i.e., the signal is set) at a time T1, the flip-flop circuit 1 outputs the interrupt cause state signal S1 of a high level to the delay circuit 2, the AND circuit 4, the OR circuit 21, and the interrupt vector generating circuit 23 in sync with setting of the interrupt cause signal SA.

Since the interrupt cause state signal S1 of a high level is input at the time T1, the OR circuit 21 outputs the logical OR signal S11 of a high level to the flip-flop circuit 22. Further, at the time T1, the pulse signal S2 is output to the OR circuit 19 in sync with setting of the interrupt cause state signal S1 by the pulse generating circuit composed of the delay circuit 2, the inverter circuit 3, and the AND circuit 4. Since the pulse signal S2 of a high level is input at the time T1, the OR circuit 19 outputs a similar pulsed logical OR signal to the delay circuit 20. The delay circuit 20 delays the pulsed logical OR signal input from the OR circuit 19 a predetermined period of time, and outputs the pulsed sync signal S10 to the flip-flop circuit 22.

At a time T2, the flip-flop circuit 22 outputs the state (here, a high level) of the logical OR signal S11 to the CPU and the interrupt vector generating circuit 23 as an interrupt signal S12 in sync with setting of the sync signal S10. Further, at the time T2, the interrupt vector generating circuit 23 outputs the vector signal S13 corresponding to the interrupt cause state signal S1 to the CPU and the decoder circuit 24 in sync with setting of the interrupt signal S12. In other words, since the state of the interrupt cause state signal S1 is in a high level, the interrupt vector generating circuit 23 outputs the vector signal S13 indicative of the address on the memory in which the interrupt processing program to be executed by the CPU in accordance with the interrupt cause signal SA is stored. Further, the decoder circuit 24 specifies that the interrupt vector signal S13 is output correspondingly to the interrupt cause signal SA, and outputs the specifying signal of a high level to the AND circuit 25.

On the other hand, when the interrupt signal of a high level is input in the CPU at the time T2, in other words, the CPU recognizes occurrence of the interrupt request, the CPU executes the interrupt processing program stored in the address on the memory indicated by the interrupt vector signal S13, thus performing the interrupt process corresponding to the interrupt cause signal SA.

Subsequently, when the interrupt cause signal SB is controlled to be in a high level (i.e., the signal is set) at a time T3, the flip-flop circuit 5 outputs the interrupt cause state signal S3 of a high level to the delay circuit 6, the AND circuit 8, the OR circuit 21, and the interrupt vector generating circuit 23 in sync with setting of the interrupt cause signal SB. Since the interrupt cause state signals S1, S3 are in a high level at the time T3, the OR circuit 21 continues to output the logical OR signal S11 of a high level to the flip-flop circuit 22.

Further, at the time T3, the pulse signal S4 is output to the OR circuit 19 in sync with setting of the interrupt cause state signal S3 by the pulse generating circuit composed of the delay circuit 6, the inverter circuit 7, and the AND circuit 8. Since the pulse signal S4 of a high level is input at the time T3, the OR circuit 19 outputs a similar pulsed logical OR signal to the delay circuit 20. The delay circuit 20 delays the pulsed logical OR signal input from the OR circuit 19 a predetermined period of time, and outputs the pulsed sync signal S10 to the flip-flop circuit 22.

As described above, although the pulsed sync signal S10 is input to the flip-flop circuit 22 at the time T4, since the pulse signal S8 to define resetting of the flip-flop circuit 22 has not been input yet at that time, the flip-flop circuit 22 continues to output the interrupt signal S12 of a high level regardless of the input of the sync signal S10. Further, since the interrupt signal S12 is kept in a high level, the interrupt vector generating circuit 23 continues to output the interrupt vector signal S13 corresponding to the interrupt cause signal SA. In other words, the decoder circuit 24 continues to output the specifying signal of a high level to the AND circuit 25.

Further, it is assumed that after completion of the interrupt process corresponding to the interrupt cause signal SA, the CPU controls the interrupt acceptance signal S7, which indicates the transition to the state in which the next interrupt process can be received, to be in a high level (i.e., the signal is set) at a time T5.

At the time T5, the pulse generating circuit composed of the delay circuit 13, the inverter circuit 14 and the AND circuit 15 outputs the pulse signal S8 to the flip-flop circuit 22, the AND circuit 25, the AND circuit 26, and the AND circuit 27 in sync with setting of the interrupt acceptance signal S7. The flip-flop circuit 22 controls the interrupt signal S12 to be in a low level (i.e., resets the signal) at the time T5 in sync with the rising edge of the pulse signal S8. On the other hand, since the specifying signal of a high level and the pulse signal S8 of a high level are input at the time T5, the AND circuit 25 outputs the pulsed reset signal S14 to the flip-flop circuit 1. Therefore, the flip-flop circuit 1 controls the interrupt cause state signal S1 to be in a low level (i.e., resets the signal) in sync with setting of a reset signal S14 at the time T5. It should be noted that since the interrupt cause state signal S3 is in a high level at this time, the OR circuit 21 continues to output the logical OR signal S11 of a high level.

Then, assuming that the interrupt acceptance signal S7 is controlled to be in a low level (i.e., the signal is reset) at a time T6, the pulse generating circuit composed of the delay circuit 16, the inverter 17 and the AND circuit 18 outputs the pulse signal S9 of a high level to the OR circuit 19 in sync with resetting of the interrupt acceptance signal S7. Since the pulse signal S9 of a high level is input at the time T6, the OR circuit 19 outputs a similar pulsed logical OR signal to the delay circuit 20. The delay circuit 20 delays the pulsed logical OR signal input from the OR circuit 19 a predetermined period of time, and outputs the pulsed sync signal S10 to the flip-flop circuit 22.

At a time T7, the flip-flop circuit 22 outputs the state (here, a high level) of the logical OR signal S11 to the CPU and the interrupt vector generating circuit 23 as an interrupt signal S12 in sync with setting of the sync signal S10. Further, at the time T7, the interrupt vector generating circuit 23 outputs the vector signal S13 corresponding to the interrupt cause state signal S3 to the CPU and the decoder circuit 24 in sync with setting of the interrupt signal S12. In other words, since the state of the interrupt cause state signal S3 is in a high level, the interrupt vector generating circuit 23 outputs the vector signal S13 indicative of the address on the memory in which the interrupt processing program to be executed by the CPU in accordance with the interrupt cause signal SB is stored. Further, the decoder circuit 24 specifies that the interrupt vector signal S13 is output correspondingly to the interrupt cause signal SB, and outputs the specifying signal of a high level to the AND circuit 26.

On the other hand, when the interrupt signal of a high level is input in the CPU at the time T7, in other words, the CPU recognizes occurrence of the next interrupt request, the CPU executes the interrupt processing program stored in the address on the memory indicated by the interrupt vector signal S13, thus performing the interrupt process corresponding to the interrupt cause signal SB. Further, it is assumed that after completion of the interrupt process corresponding to the interrupt cause signal SB, the CPU controls the interrupt acceptance signal S7, which indicates the transition to the state in which the next interrupt process can be received, to be in a high level (i.e., the signal is set) at a time T8.

At the time T8, the pulse generating circuit composed of the delay circuit 13, the inverter circuit 14 and the AND circuit 15 outputs the pulse signal S8 to the flip-flop circuit 22, the AND circuit 25, the AND circuit 26, and the AND circuit 27 in sync with setting of the interrupt acceptance signal S7. The flip-flop circuit 22 controls the interrupt signal S12 to be in a low level (i.e., resets the signal) at the time T8 in sync with setting of the pulse signal S8. On the other hand, since the specifying signal of a high level and the pulse signal S8 of a high level are input at the time T8, the AND circuit 26 outputs the pulsed reset signal S15 to the flip-flop circuit 5. Therefore, the flip-flop circuit 5 controls the interrupt cause state signal S3 to be in a low level (i.e., resets the signal) in sync with setting of a reset signal S15 at the time T8. It should be noted that since all of the interrupt cause state signals are in a low level at this time, the OR circuit 21 outputs the logical OR signal S11 of a low level.

Thereafter, the interrupt signal S12 and the interrupt vector signal S13 are output in a similar manner in accordance with the states of the interrupt cause signal SA, the interrupt cause SB, the interrupt cause signal SC, and the interrupt acceptance signal S7.

As described above, according to the interrupt control circuit C1 of the first embodiment, since the interrupt signal S12 is output in sync with the interrupt acceptance signal S7 input from the interrupt process execution circuit such as the CPU, it is possible to correspond to the asynchronous type CPU without requiring a common clock signal as required in the related art, thus a higher speed and lower power consumption can be realized. Further, since the interrupt control circuit in the related art is not provided with a function of storing or initializing the state of the interrupt cause signal, such a function needs to be provided to the external circuit side, thus the design work efficiency is deteriorated to incur lengthening of the design period therefor. In contrast, the interrupt control circuit C1 is provided with the function of storing or initializing the state of the interrupt cause signal, in other words, the interrupt cause storage circuits (the flip-flop circuits 1, 5, and 9) and the reset signal generating circuit (the decoder circuit 24, and the AND circuits 25, 26, and 27) for outputting the reset signal to the interrupt cause storage circuit, increase in the design work efficiency and shortening of the design period can be realized.

Second Embodiment

Figure 3:
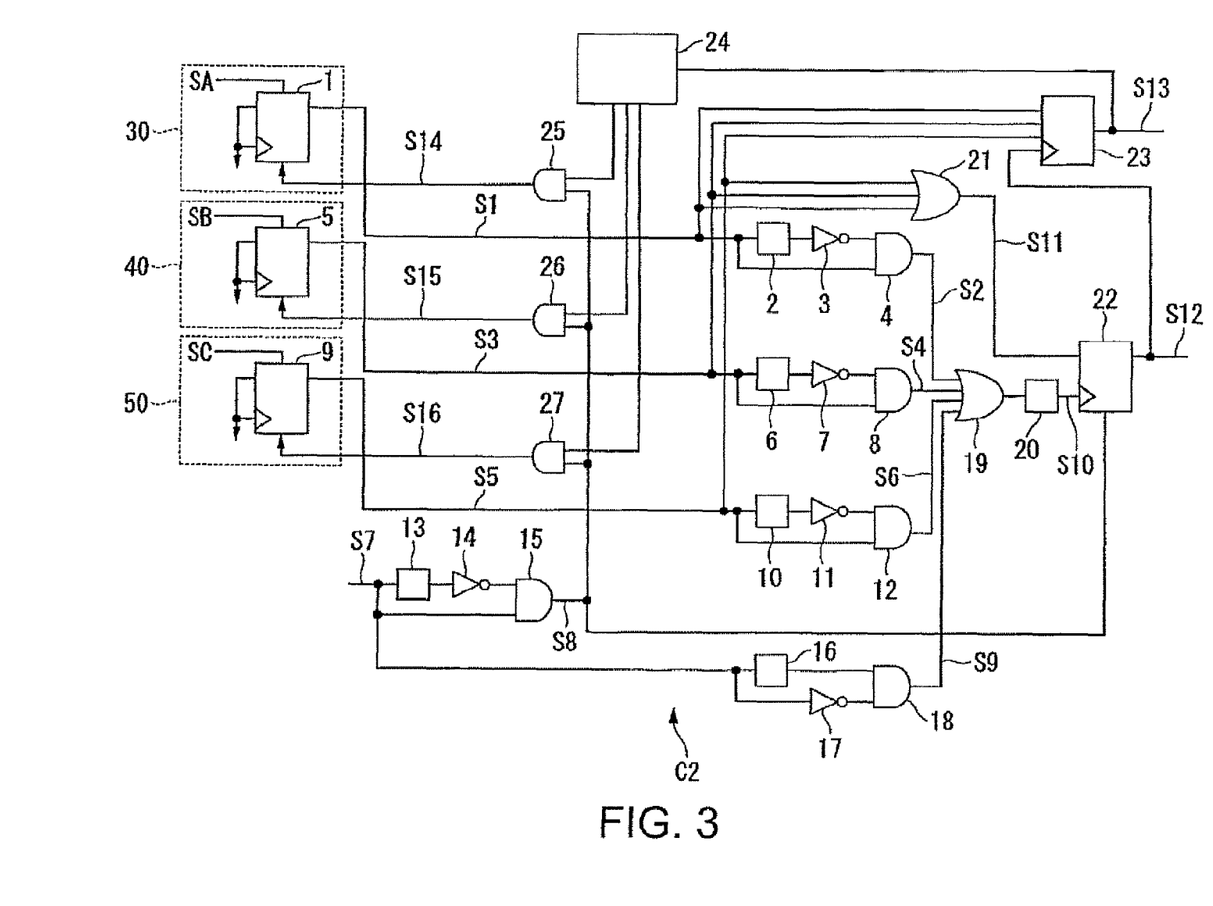
FIG. 3 is a block diagram showing a configuration of an interrupt control circuit according to a second embodiment of the invention.

Then, an interrupt control circuit according to a second embodiment of the invention will be explained. FIG. 3 is a block diagram showing a configuration of an interrupt control circuit C2 according to the second embodiment. It should be noted that in FIG. 3, similar components to those shown in FIG. 1 are denoted with the same reference numerals to omit the explanations therefor, and the points different from FIG. 1 will hereinafter be explained.

In the second embodiment, there is described a configuration of the interrupt control circuit C2 in the case in which the function of storing and initializing the state of the interrupt cause signal is provided to each of external circuits. In other words, the interrupt control circuit C2 is not provided with the flip-flop circuits 1, 5, and 9, but an external circuit 30 is provided with the flip-flop circuit 1, an external circuit 40 is provided with the flip-flop circuit 5, and an external circuit 50 is provided with the flip-flop circuit 9.

The interrupt control circuit C2 has the interrupt cause state signal S1 output from the flip-flop circuit 1 in the external circuit 30, the interrupt cause state signal S3 output from the flip-flop circuit 5 in the external circuit 40, and the interrupt cause state signal S5 output from the flip-flop circuit 9 in the external circuit 50 as inputs. The interrupt cause state signal S1 is input to the delay circuit 2, the AND circuit 4, the OR circuit 21, and the interrupt vector generating circuit 23, the interrupt cause state signal S3 is input to the delay circuit 6, the AND circuit 8, the OR circuit 21, and the interrupt vector generating circuit 23, and the interrupt cause state signal S5 is input to the delay circuit 10, the AND circuit 12, the OR circuit 21, and the interrupt vector generating circuit 23.

Further, the AND circuit 25 outputs the reset signal S14 to the flip-flop circuit 1 in the external circuit 30. The AND circuit 26 outputs the reset signal S15 to the flip-flop circuit 5 in the external circuit 40. The AND circuit 27 outputs the reset signal S16 to the flip-flop circuit 9 in the external circuit 50.

It should be noted that the timing chart showing the operation of the interrupt control circuit C2 in the second embodiment configured as described above is similar to that in the first embodiment (FIG. 2), and consequently, the explanations therefor will be omitted here.

As described above, also in the case in which the function of storing and initializing the state of the interrupt cause signal is provided to each of the external circuits, by using the present interrupt control circuit C2, it is possible to correspond to the asynchronous type CPU, thus a higher speed and lower power consumption can be realized.

Circuit Board

Hereinafter, a circuit board equipped with either one of the interrupt control circuits C1 and C2 described above will be explained.

Figure 4:
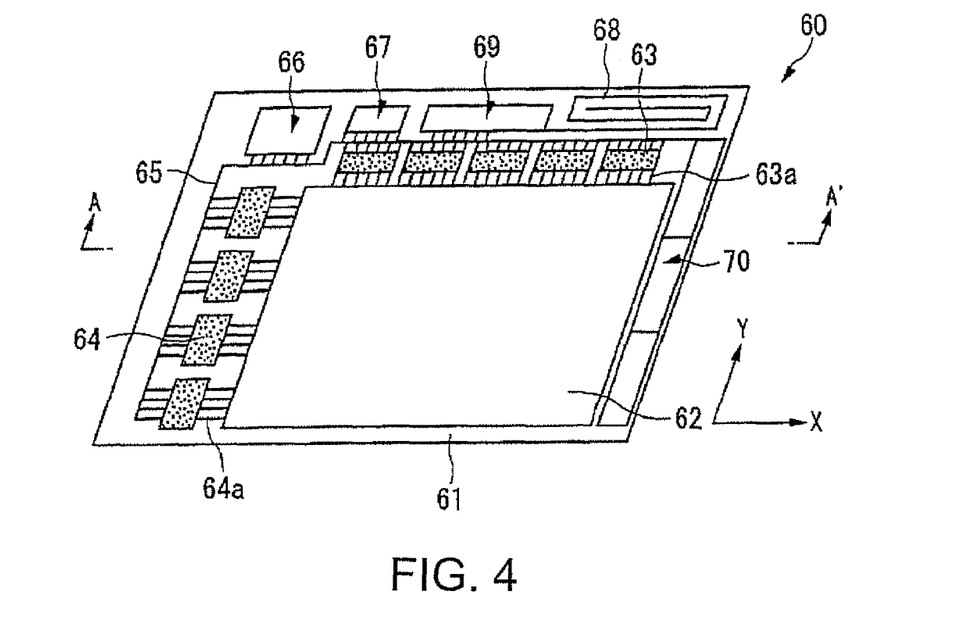
FIG. 4 is a plan view showing a specific example of a circuit board provided with the interrupt control circuit according to the embodiment of the invention.

FIG. 4 is a schematic plan view showing a specific example of a circuit board 60 equipped with either one of the interrupt control circuits C1 and C2 according to the embodiments of the invention. As shown in FIG. 4, the circuit board 60 has a display area 62 provided with organic TFT (not shown) as active elements, formed on a flexible substrate 61, and further has a first and second drive circuits 63, 64, a CPU 66, a RAM 67, an antenna pattern 68, an analog RF circuit 69, and a solar battery 70 all connected to the first and second drive circuits 63, 64 via a bus wiring 65 disposed in the periphery of the display area 62.

The flexible substrate 61 can be made of various materials with no limitation to transparent materials or opaque materials. In the present embodiment, a plastic substrate is adopted as a material especially superior in flexibility. Specifically, a plastic substrate (a resin substrate) made of, for example, polyethylene terephthalate (PET), polyethylene naphthalate (PEN), polyethersulfone (PES), polycarbonate (PC), aromatic polyester (liquid crystal polymer), polyimide (PI) can be exemplified. Further, besides the above, a glass substrate, a silicon substrate, a metal substrate, a gallium arsenide substrate, and so on can also be adopted providing these substrates have flexibility.

The first and second drive circuits 63, 64 are each a semiconductor chip including low-temperature polysilicon thin film transistors (LTPS-TFT), and gathered in two adjacent sides of the periphery of the flexible substrate 61 to be disposed in lines (lines of element chips) along the X and Y directions in the drawing. The first and second drive circuits 63, 64 are fixed on the flexible substrate 61 with an adhesive. Specific configurations of the first and second drive circuits 63, 64 are not particularly limited, but LTPS-TFT is preferably used because a high field-effect rate can be obtained to enable high-speed driving, and only a small occupied area is required on the flexible substrate 61.

Data lines 63a are wiring extending in the display area 62 in the Y direction in FIG. 4, connected to source electrodes of the organic TFT in the display area 62, and electrically connected to the first drive circuits 63 at positions extending in the +Y direction from the display area 62. Scan lines 64a are wiring extending in the display area 62 in the X direction, electrically connected to gate electrodes of the organic TFT in the display area 62, and further electrically connected to the second drive circuits 64 at positions extending in the −X direction from the display area 62. It is arranged that the first drive circuits 63 supply the data lines 63a for the organic TFT with power, and the second drive circuits 64 supply the scan lines 64a with the drive signals, thereby performing active driving of the organic TFT.

Figure 5:
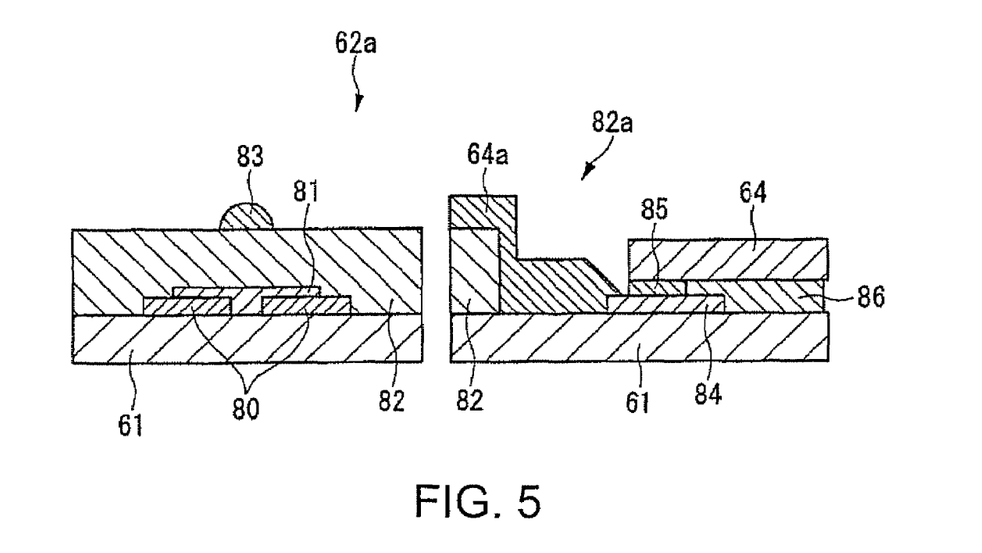
FIG. 5 is a cross-sectional view showing a specific example of a circuit board provided with the interrupt control circuit according to the embodiment of the invention.

Then, the organic TFT 62a will be explained with reference to FIG. 5. FIG. 5 is a cross-sectional view of a substantial part at a position along the A-A' line shown in FIG. 4. The organic TFT 62a is a transistor with a so-called top-gate structure having the source electrode and the drain electrode 80, an organic semiconductor layer 81, an insulating layer 82, the gate electrode 83 stacked on the flexible substrate 61 in this order from the side of the flexible substrate 61. Further, pixel electrodes not shown are provided correspondingly to the organic TFT 62a, and each of the pixel electrodes is electrically connected to the drain electrode 80 via a contact hole. It should be noted that although the top-gate structure is explained in the present embodiment, the structure is not a limitation, but the bottom-gate structure can also be adopted.

The gate electrode 83 of the organic TFT 62a is electrically connected to the scan line 64a extending in the X direction of the flexible substrate 61 directly or indirectly via other wiring, and further electrically connected to a terminal section 85 of the second drive circuit 64 via a connection section 84 formed in the periphery of the flexible substrate 61. As shown in FIG. 5, since the organic TFT 62a has the insulating layer 82 forming a step section 82a in the periphery thereof, the scan line 64a provided on the insulating layer 82 is formed to cover the surface of the insulating layer 82 so as to extend along the step section 82a, and to reach the connection section 84. The connection section 84 is, for example, a metal pad formed on the flexible substrate 61, and provided on each of the wiring lines, and the second drive circuits 64 are fixed to the flexible substrate 61 with an adhesive 86. Further, the terminal section 85 formed on a surface of the second drive circuit 64 on the side opposed to the flexible substrate 61 has contact with the connection section 84 on the flexible substrate 61 and is electrically connected thereto.

Although not shown in FIG. 5, the source electrode 80 of the organic TFT 62a is connected to the data line 63a extending along the Y direction directly or indirectly via other wiring, and the end section of the data line 63a is connected to a terminal section provided to the first drive circuit 63.

It should be noted that since the source electrode 80 and the data line 63a are formed in a lower area of the insulating layer 82, the data line 63a extends from an area between the flexible substrate 61 and the insulating layer 82 in the Y direction shown in FIG. 4 at the end section of the insulating layer 82 on the side of the first drive circuit 63, and the extending section forms a connection terminal with the first drive circuit 63.

Going back to FIG. 4, the explanation will be presented. The CPU 66 is a semiconductor chip for performing overall control of the total operations of the circuit board 60 based on a baseband signal obtained via the antenna pattern 68 and the analog RF circuit 69. The RAM 67 is a working memory used for the control operations by the CPU 66. The antenna pattern 68 receives an RF signal transmitted from the outside and output it to the analog RF circuit 69. The analog RF circuit 69 executes signal processing such as amplification, frequency conversion, or demodulation on the RF signal received via the antenna pattern 68 to convert it into the baseband signal, and outputs it to the CPU 66. The solar battery 70 supplies the first drive circuits 63, the second drive circuits 64, the CPU 66, the RAM 67, and the analog RF circuit 69 with a power supply voltage. It should be noted that the CPU 66, the RAM 67, the antenna pattern 68, the analog RF circuit 69, and the solar battery 70 are also fixed on the flexible substrate 61 with an adhesive or the like.

Each of the interrupt control circuits C1, C2 according to the embodiments of the invention can be used as an interrupt control circuit for the CPU 66 described above, and can be disposed inside the CPU 66 or the analog RF circuit 69. Therefore, a CPU compliant to an asynchronous circuit can be used as the CPU 66, a circuit board capable of realizing a higher speed and lower power consumption can be obtained.

Electro-Optic Device

Figure 6:
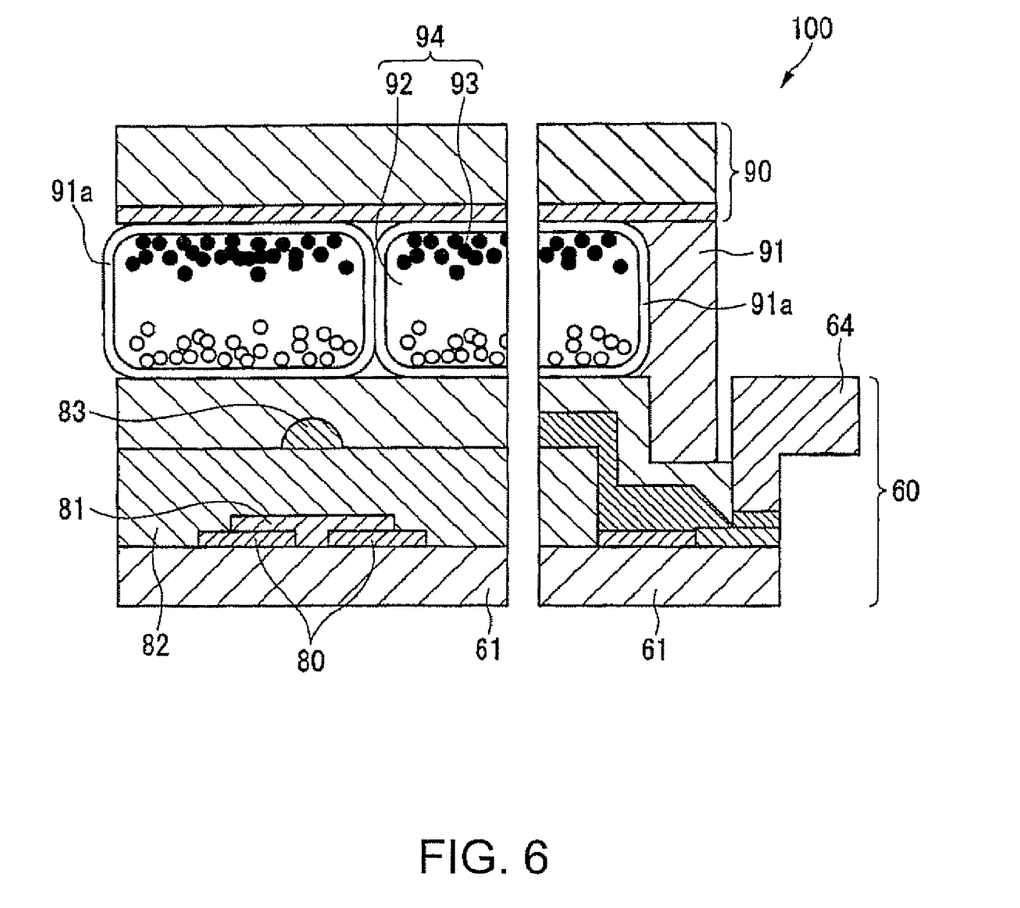
FIG. 6 is a cross-sectional view showing a specific example of an electro-optic device provided with the circuit board according to the embodiment of the invention.

Hereinafter, an electro-optic device equipped with the circuit board 60 described above will be explained. It should be noted that in the present embodiment, an electrophoretic display device configured using the circuit board 60 described above is explained as the electro-optic device. FIG. 6 is a cross-sectional view showing a schematic configuration of the present electrophoretic display device 100. As shown in FIG. 6, the electrophoretic display device 100 is configured by using the circuit board 60 as the TFT substrate, disposing an opposed substrate 90 so as to be opposed to the TFT substrate, disposing an electrophoretic layer (an electro-optic layer) 91 between the both substrates 60, 90.

Here, the electrophoretic layer 91 has a configuration with a plurality of microcapsules 91a. The microcapsules 91a are each formed of a resin capsule with substantially the same size as one pixel, and are disposed so as to cover the entire display area. Further, since the microcapsules 91a are actually adhered to adjacent ones, the display area 62 is covered tightly with the microcapsules 91a. Each of the microcapsules 91a encapsulates an electrophoretic dispersion liquid 94 including a dispersion medium 92 and electrophoretic particles 93.

Then, the electrophoretic dispersion liquid 94 including the dispersion medium 92 and the electrophoretic particles 93 will be explained.

The electrophoretic dispersion liquid 94 has a configuration of dispersing the electrophoretic particles 93 in the dispersion medium 92 stained with dye. The electrophoretic particles 93 are each a substantially spherical microparticle with a diameter of about 0.01 through 10 μm made of an inorganic oxide or an inorganic hydroxide, and provided with a different hue (including white and black) from that of the dispersion medium 92 described above. The electrophoretic particle 93 made of an oxide or a hydroxide as described above has an inherent surface isoelectric point, and the surface charge density (the amount of charge) thereof varies in accordance with the hydrogen-ion exponent (pH) of the dispersion medium.

It should be noted that the surface isoelectric point represents the condition in which the algebraic sum of the charge of the ampholyte in an aqueous solution by the hydrogen-ion exponent (pH). For example, when the pH of the dispersion medium 92 is equal to the surface isoelectric point of the electrophoretic particle 93, the effective charge of the particle becomes zero, and the particle becomes in a state independent of an external electric field. Further, when the pH of the dispersion medium 92 is lower than the surface isoelectric point, the surface of the particle is charged positively pursuant to a Formula 1 below. On the contrary, when the pH of the dispersion medium 92 is higher than the surface isoelectric point, the surface of the particle is charged negatively pursuant to a Formula 2 below.

Low pH: $M-OH+H^+(excess)+OH^-\rightarrow M-OH_2^++OH^-$ (1)

High pH: $M-OH+H^++OH^-(excess)\rightarrow M-OH^-+H^+$ (2)

It should be noted that although the amount of charge of the particle increases along the reaction formulas Formula 1 and Formula 2 while increasing the difference between the pH of the dispersion medium 92 and the surface isoelectric point, the amount of charge is saturated when the difference exceeds a predetermined value, and the amount of charge does not change if the difference is further changed. Although the difference value varies in accordance with the type, size, and shape of the particle and so on, it is conceivable that the amount of charge is substantially saturated in any particles if the difference value exceeds one.

As the electrophoretic particle 93, for example, titanium dioxide, zinc oxide, magnesium oxide, colcothar, aluminum oxide, black low-oxide titanium, chromium oxide, boehmite, FeOOH, silicon dioxide, magnesium hydroxide, nickel hydroxide, zirconium oxide, or copper oxide is used.

Further, such an electrophoretic particle 93 can be used not only as a single microparticle, but also in a condition treated with various surface reformulations. As such surface reformulations, for example, a method of coating the surface of the particle with a polymer such as acrylic resin, epoxy resin, polyester resin, polyurethane resin, a method of executing a coupling treatment with a coupling agent such as silane, titanate, aluminum, or fluorine, and a method of executing a grafting copolymerization with an acrylic monomer, a styrene monomer, an epoxy monomer, isocyanate monomer, and so on can be cited, and these treatments can be performed alone or in combination.

As the dispersion medium 92, a nonaqueous organic solvent such as carbon hydride, halogenated hydrocarbon, or ether is used, and the dispersion medium 92 is stained with dye such as Spirit Black, Oil Yellow, Oil Blue, Oil Green, Valifast Blue, Macrolex Blue, Oil Brown, Sudan Black, or Fast Orange to present a different hue from that of the electrophoretic particle 93.

In the electrophoretic display device 100 configured as described above, since the configuration provided with the circuit board 60 described above is adopted, a higher speed and lower power consumption can be achieved, and a flexible display device can be realized. It should be noted that it is obvious that the electro-optic device using the circuit board 60 according to the embodiments of the invention is not limited to the present embodiment, but can preferably be used for a liquid crystal display, an organic EL display, and so on.

Electronic Apparatus

The electrophoretic display device 100 can be applied to various electronic apparatuses equipped with a display section. Examples of the electronic apparatuses equipped with the electrophoretic display device 100 will hereinafter be explained.

Figure 7:
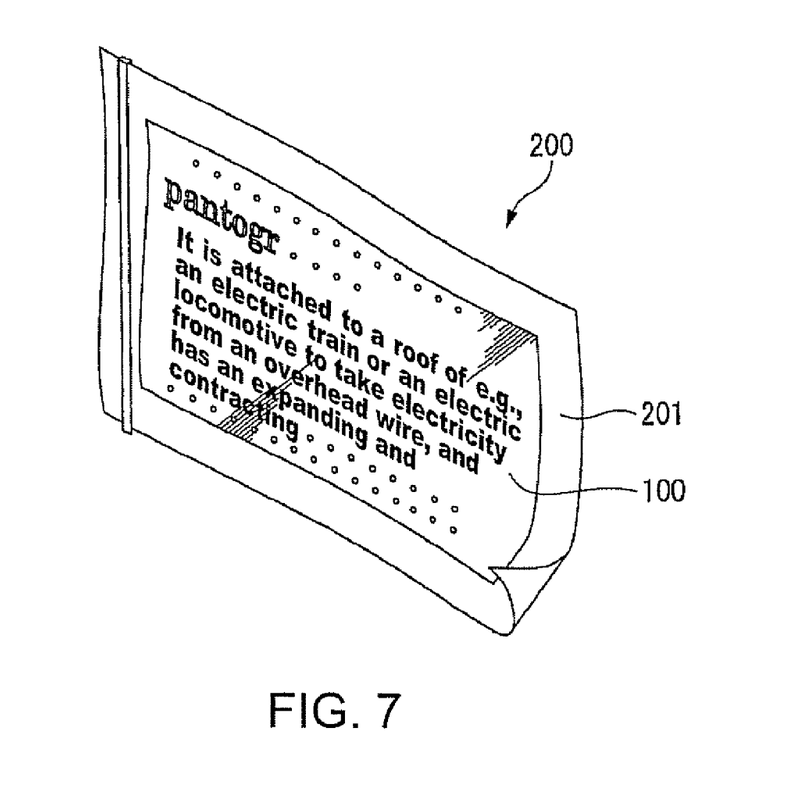
FIG. 7 is a first specific example of an electronic apparatus provided with the electro-optic device according to the embodiment of the invention.

Firstly, an example of applying the electrophoretic display device 100 to a flexible electronic paper will be explained. FIG. 7 is a perspective view showing a configuration of the electronic paper, wherein the electronic paper 200 is provided with the electrophoretic display device 100 as a display section. The electronic paper 200 is configured to be provided with a main body 201 formed of a sheet having a texture and flexibility similar to those of existing paper.

Figure 8:
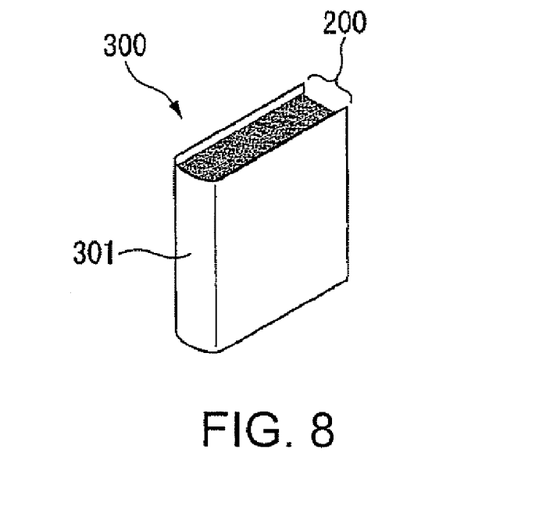
FIG. 8 is a second specific example of an electronic apparatus provided with the electro-optic device according to the embodiment of the invention.

Further, FIG. 8 is a perspective view showing a configuration of an electronic notebook, wherein the electronic notebook 300 has a plurality of electronic papers 200 shown in FIG. 7, which are bundled and held by a cover 301. The cover 301 is provided with a display data input section not shown for inputting display data transmitted from, for example, an external device. Thus, the electronic papers 200 can modify or update the display contents in accordance with the display data while keeping the bundled form.

It should be noted that, in addition to the examples described above, liquid crystal televisions, video cassette recorders of viewfinder types or direct monitor types, car navigation devices, pagers, personal digital assistants, electric calculators, word processors, work stations, picture phones, POS terminals, apparatuses equipped with a touch panel and so forth can be cited as further examples thereof. The electro-optic device according to the embodiment of the present invention can also be applied to the display sections of the electronic apparatuses described above.

What is claimed is:

1. An interrupt control circuit comprising:
  a section that generates an interrupt signal for requesting an interrupt in response to occurrence of a plurality of interrupt causes;
  a section that generates an interrupt vector signal for indicating a storing destination of an interrupt processing program corresponding any of the plurality of interrupt causes;
  a section that outputs the interrupt signal and the interrupt vector signal to an interrupt process executing circuit;
  a section that controls the interrupt signal and an output value of the interrupt vector signal in sync with an interrupt acceptance signal input from the interrupt process executing circuit, the interrupt acceptance signal representing a condition in which an interrupt process is acceptable;
  an interrupt signal generating circuit;
  an interrupt vector generating circuit;
  a reset signal generating circuit;
  an interrupt cause storage circuit for storing a state of each of a plurality of interrupt causes;
  a first pulse generating circuit provided for each of the plurality of interrupt causes and for generating a pulse signal in sync with change in a state of a corresponding any of the plurality of interrupt causes;
  a second pulse generating circuit for outputting a pulse signal in sync with the change in the interrupt acceptance signal when the change in the interrupt acceptance signal represents resetting of an interrupt process acceptance;
  a first logical OR circuit for outputting a logical OR signal of the pulse signal output from the first pulse generating circuit and the pulse signal output from the second pulse generating circuit;
  a second logical OR circuit for outputting a logical OR signal of signals for respectively representing the states of the plurality of interrupt causes; and
  a third pulse generating circuit for outputting a pulse signal in sync with the change in the interrupt acceptance signal when the change in the interrupt acceptance signal represents setting of an interrupt process acceptance, wherein
  the interrupt signal generating circuit resets the interrupt signal when change in the interrupt acceptance signal represents setting of an interrupt process acceptance, and performs an updating operation of the interrupt signal when change in the interrupt acceptance signal represents resetting of the interrupt process acceptance,
  the interrupt vector generating circuit inputs an interrupt vector generation condition, and performs an updating operation of the interrupt vector signal in accordance the interrupt vector generation condition when change in the interrupt acceptance signal represents resetting of an interrupt process acceptance,
  the reset signal generating circuit generates a reset signal for resetting any of the plurality of interrupt causes indicated by the interrupt vector signal when change in the interrupt acceptance signal represents setting of an interrupt process acceptance,
  the interrupt cause storage circuit generates the interrupt vector generation condition based on the state of the storage, and when recognizing occurrence of any of the plurality of interrupt causes, instructs the interrupt signal generating circuit to set the interrupt signal,
  the state of the storage is updated in response to one of occurrence of any of the plurality of interrupt causes and resetting of any of the plurality of interrupt causes indicated by the interrupt vector signal by the reset signal,
  the interrupt signal generating circuit holds the state of the output signal of the second logical OR circuit as an interrupt signal in sync with the output signal of the first logical OR circuit, while resetting the interrupt signal in sync with the pulse signal output from the third pulse generating circuit, and
  the reset signal generating circuit outputs the reset signal in sync with the pulse signal output from the third pulse generating circuit.

2. The interrupt control circuit according to claim 1,
wherein the interrupt vector generating circuit outputs the interrupt vector signal corresponding to the interrupt cause with a higher priority based on the interrupt vector generation condition.

3. The interrupt control circuit according to claim 1,
wherein the reset signal generating circuit includes
a specifying circuit for specifying which interrupt cause signal is output correspondingly to the interrupt vector signal, and outputting a specifying signal representing a specifying result, and
a logical AND circuit provided for each of the plurality of interrupt causes, and has the specifying signal and the pulse signal output by the third pulse generating circuit as inputs, and
a pulse signal output from the logical AND circuit is the reset signal.

4. The interrupt control circuit according to claim 1,
wherein the first pulse generating circuit is configured including
a plurality of first delay circuits for delaying signals for respectively representing the states of the plurality of interrupt causes by a predetermined period of time,
a plurality of first logic inverting circuits for outputting logically inverted signals of the delayed signals respectively output from the plurality of first delay circuits, and
a plurality of first logical AND circuits for respectively outputting logical AND signals of the logically inverted signals and signals representing the states of the plurality of interrupt causes, which are origins of the respective logically inverted signals, as pulse signals.

5. The interrupt control circuit according to claim 1,
wherein the second pulse generating circuit is configured including
a second delay circuit for delaying the interrupt acceptance signal by a predetermined period of time,
a second logic inverting circuit for outputting a logically inverted signal of the interrupt acceptance signal, and
a second logical AND circuit for outputting a logical AND signal of the interrupt acceptance signal delayed by the second delay circuit and the logically inverted signal output form the second logic inverting circuit as a pulse signal.

6. The interrupt control circuit according to claim 1,
wherein the third pulse generating circuit is configured including
a third delay circuit for delaying the interrupt acceptance signal by a predetermined period of time,
a third logic inverting circuit for outputting a logically inverted signal of the interrupt acceptance signal delayed by the third delay circuit, and
a third logical AND circuit for outputting a logical AND signal of the logically inverted signal output from the third logic inverting circuit and the interrupt acceptance signal as a pulse signal.

7. The interrupt control circuit according to claim 1, further comprising:
a fourth delay circuit disposed between the first logical OR circuit and the interrupt signal generating circuit, for delaying the first logical OR signal output from the first logical OR circuit by a predetermined period of time, and outputting the delayed first logical OR signal to the interrupt signal generating circuit.

8. A circuit board comprising the interrupt control circuit according to claim 1.

9. An electro-optic device comprising the circuit board according to claim 8.

10. An electronic apparatus comprising the electro-optic device according to claim 9.

* * * * *

UNITED STATES PATENT AND TRADEMARK OFFICE
CERTIFICATE OF CORRECTION

PATENT NO. : 7,730,250 B2  Page 1 of 1
APPLICATION NO. : 11/964436
DATED : June 1, 2010
INVENTOR(S) : Takashi Nammoto

It is certified that error appears in the above-identified patent and that said Letters Patent is hereby corrected as shown below:

Title page, column 1, section (75), please change "Inventor: Takashi Nanmoto, Sendai (JP)" to --Inventor: Takashi Nammoto, Sendai (JP)--.

Signed and Sealed this

Twenty-fourth Day of August, 2010

David J. Kappos
*Director of the United States Patent and Trademark Office*